United States Patent
Li

(10) Patent No.: US 12,389,475 B2
(45) Date of Patent: Aug. 12, 2025

(54) METHOD FOR NETWORK SHARING AND RELATED DEVICES

(71) Applicant: GUANGDONG OPPO MOBILE TELECOMMUNICATIONS CORP., LTD., Guangdong (CN)

(72) Inventor: Xiong Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 707 days.

(21) Appl. No.: 17/666,195

(22) Filed: Feb. 7, 2022

(65) Prior Publication Data

US 2022/0159765 A1 May 19, 2022

Related U.S. Application Data

(63) Continuation of application No. PCT/CN2020/102108, filed on Jul. 15, 2020.

(30) Foreign Application Priority Data

Aug. 31, 2019 (CN) .......................... 201910819989.1

(51) Int. Cl.
*H04W 76/15* (2018.01)
*H04W 76/30* (2018.01)
(Continued)

(52) U.S. Cl.
CPC .......... *H04W 76/15* (2018.02); *H04W 76/30* (2018.02); *H04W 84/12* (2013.01); *H04W 92/10* (2013.01)

(58) Field of Classification Search
CPC ..... H04W 76/15; H04W 76/30; H04W 84/12; H04W 92/10; H04W 76/34;
(Continued)

(56) References Cited

U.S. PATENT DOCUMENTS 9,706,383 B2 7/2017 Kiukkonen et al.
10,230,522 B1 3/2019 Roths et al.
(Continued)

FOREIGN PATENT DOCUMENTS

CN 102917406 A 2/2013
CN 202873086 U 4/2013
(Continued)

OTHER PUBLICATIONS

China First Office Action with English Translation issued in corresponding CN application No. 201910819989.1 dated Aug. 26, 2020.
(Continued)

*Primary Examiner* — Schquita D Goodwin
(74) *Attorney, Agent, or Firm* — Young Basile Hanlon & MacFarlane, P.C.

(57) ABSTRACT

A method for network sharing and related devices are provided. The method for network sharing and related devices are applied to an electronic device with a WIFI module. The method includes the following. Upon detecting a network-sharing enablement request, whether the electronic device has created two first network interfaces for WIFI network access through the WIFI module is determined. One of the two first network interfaces is released upon a determination that the electronic device has created the two first network interfaces through the WIFI module. Network sharing is enabled once the one of the two first network interfaces is successfully released.

17 Claims, 6 Drawing Sheets

(51) Int. Cl.
*H04W 84/12* (2009.01)
*H04W 92/10* (2009.01)

(58) Field of Classification Search
CPC ......... H04M 1/72448; H04M 2250/06; H04M 1/72412; H04M 1/72409
See application file for complete search history.

(56) References Cited

U.S. PATENT DOCUMENTS

| | | | | |
|---|---|---|---|---|
| 11,704,944 | B2* | 7/2023 | Wang | G07C 5/0808 |
| | | | | 701/31.4 |
| 2012/0002615 | A1 | 1/2012 | Rayrole et al. | |
| 2014/0105125 | A1 | 4/2014 | Chaponniere et al. | |
| 2019/0098566 | A1* | 3/2019 | Li | H04W 88/06 |
| 2019/0230729 | A1 | 7/2019 | Barkan | |
| 2019/0373526 | A1* | 12/2019 | Chow | H04W 36/14 |
| 2021/0045040 | A1* | 2/2021 | Panje | H04W 36/38 |
| 2021/0058787 | A1* | 2/2021 | Isgar | H04W 84/12 |

FOREIGN PATENT DOCUMENTS

| | | | |
|---|---|---|---|
| CN | 103891379 | A | 6/2014 |
| CN | 105472622 | A | 4/2016 |
| CN | 106055199 | B | 10/2016 |
| CN | 106131877 | A | 11/2016 |
| CN | 106304101 | A | 1/2017 |
| CN | 106332217 | A | 1/2017 |
| CN | 107580359 | A | 1/2018 |
| CN | 108601063 | A | 9/2018 |
| CN | 109218987 | A * | 1/2019 ............ H04W 4/029 |
| CN | 109219088 | A | 1/2019 |
| IN | 108307433 | A | 7/2018 |
| KR | 20170095772 | A | 8/2017 |

OTHER PUBLICATIONS

China Second Office Action with English Translation issued in corresponding CN application No. 201910819989.1 dated Jan. 4, 2021.
China Notification to Grant Patent Right for Invention with English Translation issued in corresponding CN application No. 201910819989.1 dated Mar. 8, 2021.
International search report with English Translation issued in corresponding PCT/CN2020/102108 dated Oct. 10, 2020.
Extended European Search Report for EP Application 20856266.0 mailed Sep. 13, 2022. (8 pages).

* cited by examiner

METHOD FOR NETWORK SHARING AND RELATED DEVICES

CROSS-REFERENCE TO RELATED APPLICATION(S)

This application is a continuation of International Application No. PCT/CN2020/102108, filed on Jul. 15, 2020, which claims priority to Chinese Patent Application No. 2019108199891, filed on Aug. 31, 2019, the entire disclosures of both of which are incorporated herein by reference.

TECHNICAL FIELD

This disclosure relates to the field of electronics technology, in particular to a method for network sharing and related devices.

BACKGROUND

With continuous progress of the technology of electronic devices (such as smart phones, tablet computers, etc.), electronic devices have become an indispensable part of people's lives. The electronic device can support a WIFI function and a network sharing function. The WIFI function is used to access a WIFI network. The network sharing function is used for other devices to access the electronic device to realize network sharing.

SUMMARY

In a first aspect, implementations of the present disclosure provide a method for network sharing, which is applied to an electronic device with a WIFI module. The method includes the following.

Upon detecting a network-sharing enablement request, whether the electronic device has created two first network interfaces for WIFI network access through the WIFI module is determined. One of the two first network interfaces is released upon a determination that the electronic device has created the two first network interfaces through the WIFI module. Network sharing is enabled once the one of the two first network interfaces is successfully released.

In a second aspect, implementations of the present disclosure provide an electronic device. The electronic device includes a processor, a memory, a communication interface, and one or more programs. The one or more programs are stored in the memory and configured to be executed by the processor, and the programs include instructions for executing operations of the method described in the first aspect of the implementations of the present disclosure.

In a third aspect, implementations of the present disclosure provide a non-transitory computer-readable storage medium. The computer-readable storage medium stores a computer program for Electronic Data Interchange (EDI). The computer program causes a computer to perform part or all of operations of the method described in the first aspect of the implementations of the present disclosure.

BRIEF DESCRIPTION OF DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The following are described in detail.

Hereinafter, method implementations of the disclosure will be interpreted in detail.

The terms "first", "second", "third", "fourth", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Figure 1:
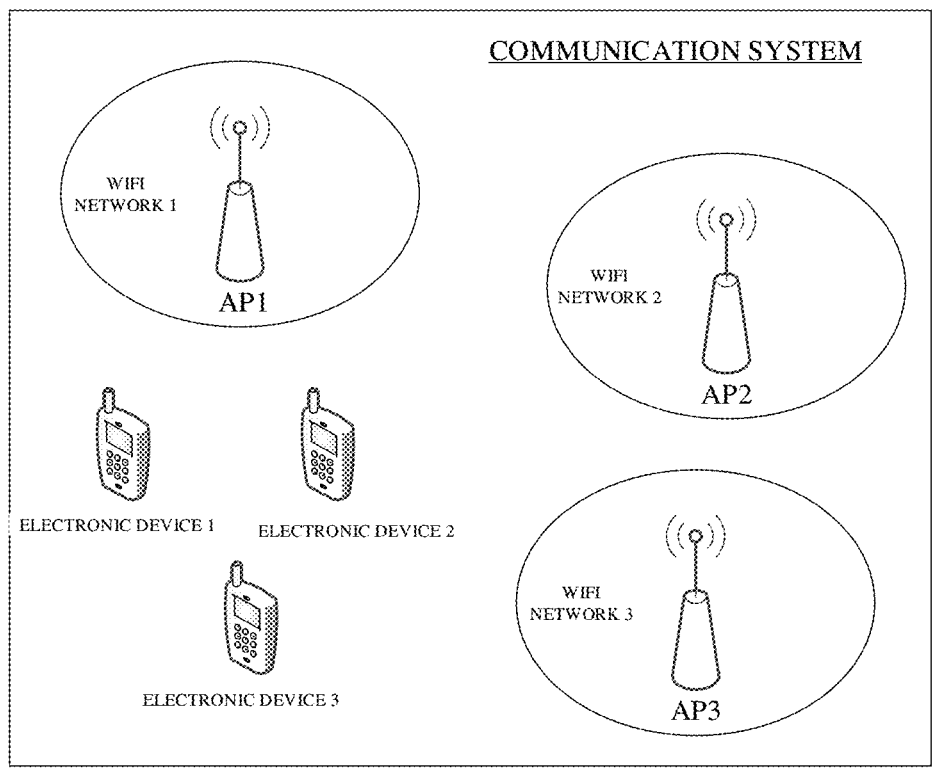
FIG. 1 is a schematic structural diagram of a communication system provided in implementations of the present disclosure.

FIG. 1 illustrates a communication system provided in implementations of the disclosure, referring to FIG. 1, the communication system includes multiple electronic devices and multiple wireless Access Points (AP), and an AP is an access point of a WIFI network. In the implementations of the disclosure, the electronic device supports a dual-WIFI function, that is, the electronic device can access two WIFI networks. For example, the electronic device can access WIFI network 1 through AP1 and WIFI network 2 through AP2. The electronic device supports coexistence of a WIFI function and a network sharing function. For example, electronic device 1 accesses WIFI network 1 through AP1, and electronic device 1 creates a WIFI network, and electronic device 2 accesses the WIFI network created by the electronic device 1 through the electronic device 1. Forms and numbers of the electronic devices and APs illustrated in FIG. 1 are by way of example only, and do not present a limitation on implementations of the disclosure.

The electronic device can include various handheld devices, vehicle-mounted devices, wearable devices, computing devices with a wireless communication function or other processing devices connected to a wireless modem, as well as various forms of User Equipment (UE), Mobile Station (MS), terminal device and the like.

Figure 2:
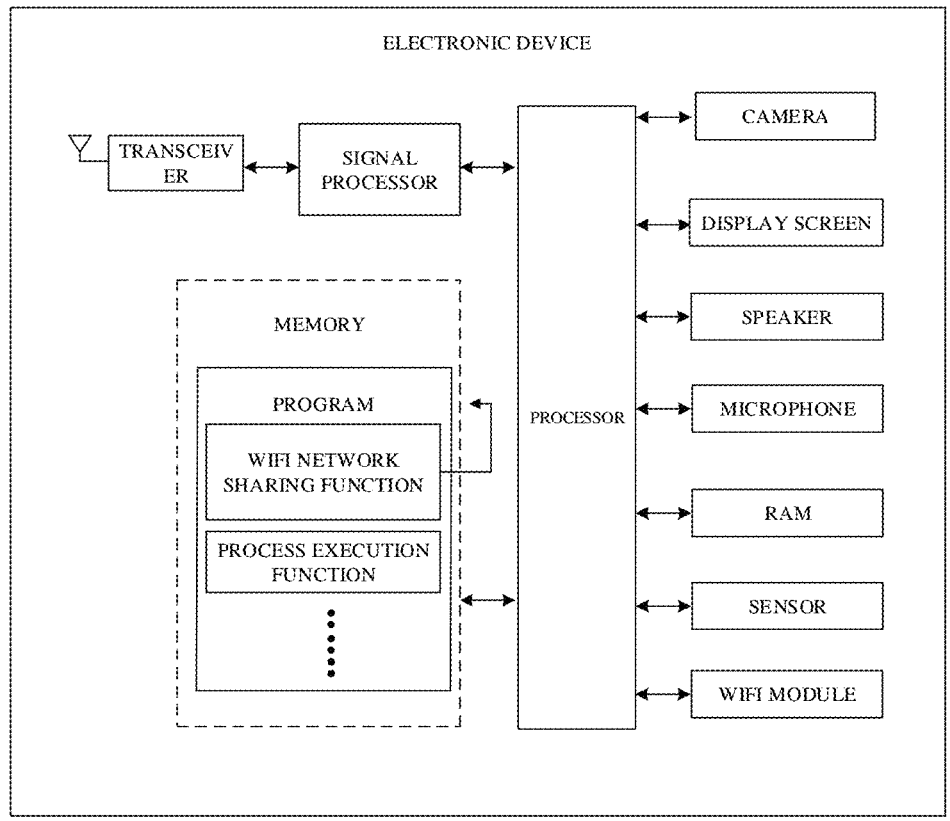
FIG. 2 is a schematic structural diagram of an electronic device provided in implementations of the present disclosure.

FIG. 2 is a schematic structural diagram of an electronic device according to implementations of the present disclosure. As illustrated in FIG. 2, the electronic device includes a processor, a memory, a signal processor, a transceiver, a display screen, a speaker, a microphone, a Random Access Memory (RAM), a camera, a sensor, a WIFI module, and the like. The memory, the signal processor, the display screen, the speaker, the microphone, the RAM, the camera, the sensor, and the WIFI module are connected with the processor, and the transceiver is connected with the signal processor.

The display screen can be a liquid crystal display (LCD), an organic light-emitting diode (OLED) or inorganic light-emitting diode, an active matrix organic light emitting diode (AMOLED), etc.

The camera can be an ordinary camera or an infrared camera, which is not limited herein. The camera can be a front camera or a rear camera, which is not limited herein.

The sensor includes at least one of the following: a light sensor, a gyroscope, an infrared proximity sensor, a fingerprint sensor, a pressure sensor, etc. The light sensor, also known as an ambient light sensor, is configured to detect brightness of ambient light. The light sensor may include a photosensitive element and an analog-to-digital converter. The photosensitive element is configured to convert a collected optical signal into an electrical signal, and the analog-to-digital converter is configured to convert the electrical signal into a digital signal. Optionally, the light sensor can also include a signal amplifier, which can amplify the electrical signal converted by the photosensitive element and then output it to the analog-to-digital converter. The photosensitive element may include at least one of a photodiode, a phototransistor, a photoresistor, and a silicon photocell.

The processor is a control center of the electronic device, which connects all parts of the whole electronic device using various interfaces and lines. By running or executing software programs and/or modules stored in the memory and calling data stored in the memory, the processor can perform various functions of the electronic device and process data, so as to monitor the electronic device as a whole.

The processor can be integrated with an application processor and a modem processor. The application processor mainly handles with an operating system, a user interface, and an application, and the modem processor mainly handles with wireless communications. It can be understood that the above modem processor may not be integrated into the processor.

The memory is configured to store software programs and/or modules, and the processor executes various functional applications of the electronic device and processes data by running the software programs and/or modules stored in the memory. The memory can mainly include a program storage area and a data storage area. The operating system, software programs required by at least one function, etc. can be stored in the program storage area. Data created according to use of the electronic device and the like can be stored in the data storage area. In addition, the memory may include a high-speed random access memory, or may include a non-volatile memory, such as at least one magnetic disk memory device, flash memory device, or other volatile solid-state memory devices.

The WIFI module supports a dual-WIFI (also known as dual-band WIFI) function so that the electronic device can operate at 2.4G and 5G simultaneously. With this WIFI module, one electronic device can access two different WIFI networks at the same time, so as to visit the Internet with the two WIFI networks at the same time, thus obtaining a greater transmission rate and lower network delay. The WIFI module can be, for example, a dual band dual concurrent (DBDC) module, a dual band simultaneous (DBS) module, or other chip modules.

Implementations of the disclosure will be explained in detail below.

Figure 3:
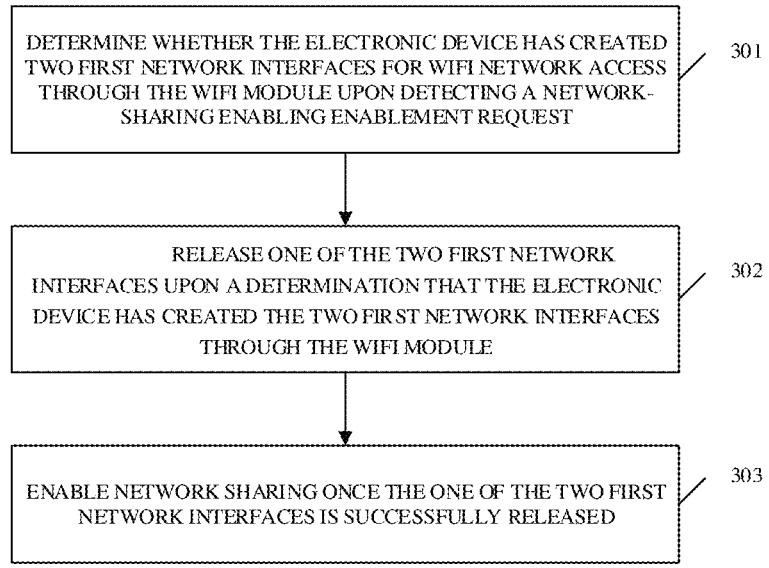
FIG. 3 is a schematic flow diagram of a method for network sharing provided in implementations of the present disclosure.

FIG. 3 is a schematic flow diagram of a method for network sharing provided in implementations of the present disclosure. The method for network sharing is applied to the above electronic device. As illustrated in FIG. 3, the method specifically includes the following.

At 301, upon detecting a network-sharing enablement request, whether the electronic device has created two first network interfaces for WIFI network access through the WIFI module is determined.

Figure 4:
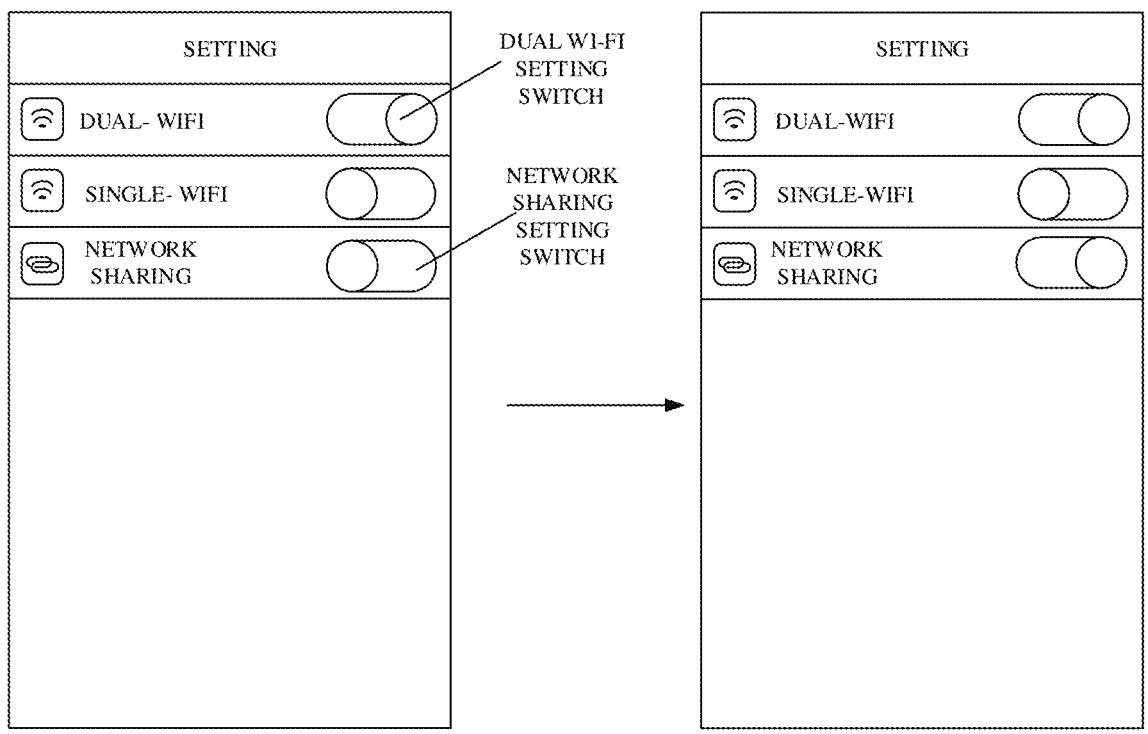
FIG. 4 is a schematic diagram of a setting user interface (UI) provided in implementations of the present disclosure.

Optionally, the network network-sharing enablement request is triggered through a setting UI. For example, as illustrated in FIG. 4, a user can trigger the network-sharing enablement request by clicking a network-sharing setting switch. The network-sharing setting switch in FIG. 4 is currently in an off-state, and after the user clicks the network-sharing setting switch, the network-sharing setting switch is in an on-state.

Or, the network-sharing enablement request is triggered by voice. For example, the user triggers the network-sharing enablement request through voice control.

Or, the network-sharing enablement request is triggered by another device. For example, the another device bound to the electronic device sends a control instruction, which is used to instruct to enable network sharing.

The network-sharing enablement request is used to request to enable network sharing.

At 302, when the electronic device has created the two first network interfaces through the WIFI module, one of the two first network interfaces is released.

Optionally, the electronic device currently accesses two WIFI networks through the two first network interfaces.

Optionally, if the electronic device does not create the two first network interfaces through the WIFI module, the electronic device enables network sharing.

The first network interface released by the electronic device is any one of the two first network interfaces; or, the electronic device has currently accessed (or, connected to) two WIFI networks through the two first network interfaces, and the first network interface released by the electronic device is a network interface associated with one of the two WIFI networks with less data transmission; or, the electronic device has currently accessed the two WIFI networks through the two first network interfaces, and the first network released by the electronic device is a network interface associated with a less important WIFI network among the two WIFI networks; or, the first network interface released by the electronic device is a network interface designated by the user among the two first network interfaces.

At 303, network sharing is enabled once the one of the two first network interfaces is successfully released.

Optionally, when the one of the two first network interfaces fails to be released, the electronic device continues to release the one of the two first network interfaces.

In an implementation of the present disclosure, network sharing is enabled as follows.

The electronic device creates a second network interface and creates a new WIFI network through the WIFI module. The electronic device shares the new WIFI network through the second network interface.

Optionally, the electronic device shares the new WIFI network through the second network interface as follows.

The electronic device creates a communication connection with other devices through the second network interface, and the created communication connection is used by the other devices to send and receive data through the new WIFI network, thereby sharing the new WIFI network.

Optionally, after the electronic device enables network sharing, the method further includes the following.

The electronic device disables network sharing, when network sharing is not used within a first duration.

The first duration is, for example, 5 min, 8 min, 10 min, 13 min, or other values.

That network sharing is not used means that there is no other device which have accessed the new WIFI network created by the electronic device; and/or there is no other devices which are accessing the new WIFI network created by the electronic device.

It can be seen that, in the implementations of the present disclosure, upon detecting the network-sharing enablement request, whether the electronic device has created two first network interfaces through the WIFI module is determined. When the electronic device has created the two first network interfaces through the WIFI module, one of the two first network interfaces is released. Once the one of the two first network interfaces is successfully released, network sharing is enabled. Since only one first network interface is released, coexistence of a Wi-Fi function and a network sharing function can be achieved and performance of the electronic device can be improved.

In an implementation of the present disclosure, the method further includes the following after the electronic device enables network sharing.

The electronic device determines whether network sharing is in use upon detecting that a dual-WIFI function of the electronic device is activated. The electronic device creates a third network interface through the WIFI module upon a determination that network sharing is not in use, and accesses a WIFI network through the third network interface.

Figure 5:
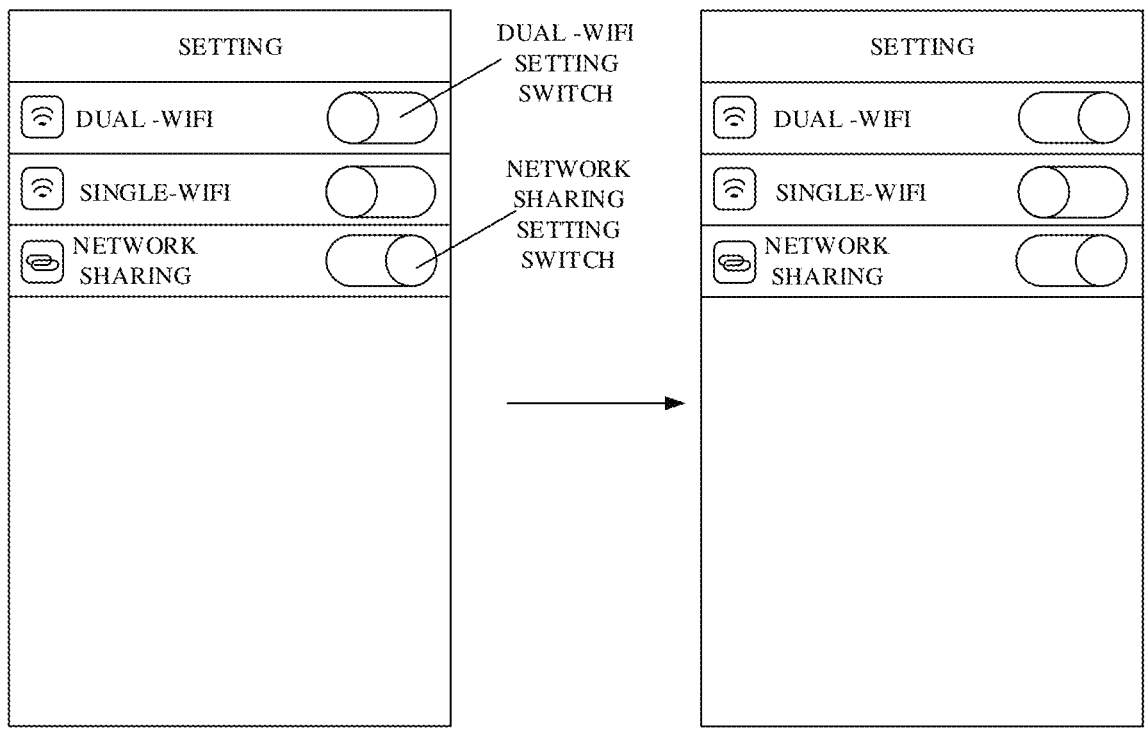
FIG. 5 is a schematic diagram of a setting UI provided in other implementations of the present disclosure.

Activation of the dual-WIFI function is triggered through the setting UI. For example, as illustrated in FIG. 5, the user can activate the dual-WIFI function by clicking a dual-WIFI setting switch. The dual-WIFI setting switch in FIG. 5 is currently in an off-state, and the network-sharing setting switch is in an on-state. After the user clicks the dual-WIFI setting switch, the dual-WIFI setting switch is set to be in the on-state.

Or, the activation of the dual-WIFI function is triggered by voice. For example, the user activates the dual-WIFI function through voice control.

Or, the activation of the dual-WIFI function is triggered by the electronic device based on a state of a WIFI network currently accessed by the electronic device. For example, when a signal strength of the WIFI network currently accessed by the electronic device is lower than a certain value, the electronic device activates the dual-WIFI function. For another example, when a transmission rate of the WIFI network currently accessed by the electronic device is lower than a certain value, the electronic device activates the dual-WIFI function.

The electronic device determines whether network sharing is in use as follows. The electronic device determines whether there is another device which has accessed the new WIFI network created by the electronic device, and/or determines whether there is another device which is accessing the new WIFI network created by the electronic device. If there is no other devices which have accessed the new WIFI network, and/or no other devices which are accessing the new WIFI network, the electronic device determines that network sharing is not in use; otherwise, the electronic device determines network share is in use.

Optionally, the method further includes that if network sharing is in use, the electronic device outputs a dual-WIFI function enablement failure prompt.

It can be seen that, in this implementation of the present disclosure, the dual-WIFI function is allowed to be enabled only when network sharing is not in use, which ensures a priority of network sharing and improves stability of network sharing.

In an implementation of the present disclosure, once the electronic device accesses two WIFI networks through the two first network interfaces, the electronic device releases the one of the two first network interfaces as follows.

The electronic device determines at least two of a first numerical value, a second numerical value, a third numerical value, and a fourth numerical value, where the first numerical value is a total data amount sent by the electronic device using a first WIFI network in the first time period, the second numerical value is a total data amount received by the electronic device using the first WIFI network of the two WIFI networks in the first time period, the third numerical value is a total data amount sent by the electronic device using a second WIFI network of the two WIFI networks in the first time period, and the fourth numerical value is a total data amount received by the electronic device using the second WIFI network in the first time period, end time of the first time period being present moment, where the two WIFI networks includes the first WIFI network and the second WIFI network. The electronic device determines a target WIFI network based on the at least two of the first numerical value, the second numerical value, the third numerical value, and the fourth numerical value, the two WIFI networks including the target WIFI network. The electronic device releases a first network interface associated with the target WIFI network.

The length of the first time period is, for example, 1 min, 2 min, 5 min, 10 min, 20 min, or other values.

The two first network interfaces correspond to the two WIFI networks in a one-to-one correspondence. For example, the two first network interfaces include first network interface 1 and first network interface 2, and the electronic device accesses one WIFI network through first network interface 1 and accesses the other WIFI network through first network interface 2.

In an implementation of the present disclosure, the electronic device determines the target WIFI network based on the at least two of the first numerical value, the second numerical value, the third numerical value, and the fourth numerical value as follows.

When a task currently processed by the electronic device includes a first task and the first task is processed using the two WIFI networks, the electronic device determines the target WIFI network based on the second numerical value and the fourth numerical value, where in the first task, a total data amount expected to be received by the electronic device is greater than or equal to a first threshold.

In an implementation of the present disclosure, the electronic device determines the target WIFI network based on the second numerical value and the fourth numerical value as follows.

The electronic device assigns the second WIFI network as the target WIFI network upon a determination that the second numerical value is greater than the fourth numerical value. The electronic device assigns the first WIFI network as the target WIFI network upon a determination that the second numerical value is less than the fourth numerical value.

In the first task, a total data amount expected to be sent by the electronic device is less than the first threshold.

The first task is, for example, a download task (such as a video download task, an audio download task, a file download task, etc.), or other tasks with a large amount of total data to be received.

The first threshold can be 5 MB, 10 MB, 30 MB, 100 MB, or other values.

The method for determining the target WIFI network according to the implementation of the disclosure can be executed when the electronic device is in an off-screen state or when the electronic device is in an on-screen state, which is not limited herein.

For example, assuming that there are two WIFI networks, WIFI network 1 and WIFI network 2, the electronic device processes the video download task using the two WIFI networks, and in the first time period, a total amount of data received by the electronic device using WIFI network 1 is 5 MB and a total amount of data received by the electronic device using WIFI network 2 is 2 MB, then the electronic device takes WIFI network 2 as the target WIFI network.

It can be seen that in the implementations of the disclosure, the currently processed task is a task with a large amount of data to be received, and at this time, a receiving capacity of the electronic device in this task is mainly concerned, so it is only necessary to compare total data amounts received using the two WIFI networks, and in this way, determination efficiency for the WIFI networks can be improved.

In an implementation of the disclosure, the electronic device determines the target WIFI network based on at least two of the first numerical value, the second numerical value, the third numerical value, and the fourth numerical value as follows.

When a task currently processed by the electronic device includes a second task and the second task is processed using the two WIFI networks, the electronic device determines the target WIFI network based on first numerical value, the second numerical value, the third numerical value, and the fourth numerical.

The electronic device determines the target WIFI network based on the first numerical value, the second numerical value, the third numerical value, and the fourth numerical as follows.

The electronic device assigns the second WIFI network as the target WIFI network when a sum of the first numerical value and the second numerical value is greater than a sum of the third numerical value and the fourth numerical value; assigns the first WIFI network as the target WIFI network if the sum of the first numerical value and the second numerical value is less than the sum of the third numerical value and the fourth numerical value.

In the second task, the total data amount expected to be received by the electronic device is greater than or equal to a second threshold, and/or the total data amount expected to be sent by the electronic device is greater than or equal to a third threshold, and/or the total data amount expected to be received by the electronic device is less than the second threshold, and/or the total data amount expected to be sent by the electronic device is less than the third threshold.

The second threshold can be equal to the third threshold, the second threshold can be less than the third threshold, or the second threshold can be greater than the third threshold, which is not limited herein.

The second threshold can be 3 MB, 4 MB, 5 MB, 10 MB, 30 MB, or other values. The third threshold can be 1 MB, 3 MB, 4 MB, 6 MB, 10 MB, 30 MB, or other values.

The second task may be, for example, a download task, an upload task, an audio playback task, a video playback task, a reading task, a payment task, a call task or the like.

The method for determining the target WIFI network according to the implementation of the disclosure can be executed when the electronic device is in an off-screen state or when the electronic device is in an on-screen state, which is not limited herein.

For example, assuming that there are two WIFI networks, WIFI network 1 and WIFI network 2, and in the first time period, a total amount of data received by the electronic device with WIFI network 1 is 5 MB and a total amount of data sent by the electronic device with WIFI network 1 is 3 MB, and a total amount of data received by the electronic device with WIFI network 2 is 2 MB and a total amount of data sent by the electronic device with WIFI network 2 is 1 MB, then the electronic device takes WIFI network 2 as the target WIFI network.

It can be seen that in the implementation of the disclosure, the total data amount received and the total data amount sent using the two WIFI networks are used to determine the target WIFI network, and because more data are used for determining, the determination accuracy for the WIFI network is improved.

Optionally, the electronic device determines the target WIFI network based on at least two of the first numerical value, the second numerical value, the third numerical value, and the fourth numerical value as follow.

When a task currently processed by the electronic device includes a third task and the third task is processed using the two WIFI networks, the electronic device determines the target WIFI network based on the first numerical value and the third numerical value, where in the third task, a total data amount expected to be sent by the electronic device is greater than or equal to a fourth threshold.

The electronic device determines the target WIFI network based on the first numerical value and the third numerical value as follows.

The electronic device assigns the second WIFI network as the target WIFI network when the first numerical value is greater than the third numerical value; assigns the first the WIFI network as the target WIFI network when the first numerical value is greater than the third numerical value.

In the third task, a total data amount expected to be received by the electronic device is less than the fourth threshold.

The third task is, for example, an upload task (such as a video upload task, an audio upload task, a file upload task, etc.), or other tasks with a large amount of total data to be sent.

The fourth threshold can be 4 MB, 5 MB, 15 MB, 35 MB, or other values.

The method for determining the target WIFI network according to the implementation of the disclosure can be executed when the electronic device is in an off-screen state or when the electronic device is in an on-screen state, which is not limited herein.

For example, assuming that there are two WIFI networks, WIFI network 1 and WIFI network 2, the electronic device processes the file upload task using the two WIFI networks, and in the first time period, a total amount of data sent by the electronic device with WIFI network 1 is 5 MB and a total amount of data sent by the electronic device with WIFI network 2 is 2 MB, then the electronic device takes WIFI network 2 as the target WIFI network.

It can be seen that, in the implementation of the disclosure, the currently processed task is a task with a large amount of data to be sent, and at this time, a sending capacity of the electronic device in this task is mainly concerned, so it is only necessary to compare the total data amounts which are sent using the two WIFI networks, and in this way, determination efficiency for the WIFI networks can be improved.

In an implementation of the present disclosure, once the electronic device accesses the two WIFI networks through the two first network interfaces, the electronic device releases the one of the two first network interfaces as follows.

The electronic device determines an access priority and a signal strength of each of the two WIFI networks. The electronic device determines a target WIFI network based on determined two access priorities and two signal strengths, the two WIFI networks including the target WIFI network. The electronic device releases a first network interface associated with the target WIFI network.

The two first network interfaces correspond to the two WIFI networks in a one-to-one correspondence. For example, the two first network interfaces include first network interface 1 and first network interface 2, and the electronic device accesses one WIFI network through first network interface 1 and accesses the other WIFI network through first network interface 2.

Optionally, the electronic device determines the signal strength of each of the two WIFI networks as follows.

The electronic device reads a state of a signal strength indicator associated with each of the two WIFI networks. The electronic device determines the signal strength of each of the two WIFI networks based on two determined states of the signal strength indicator and a first mapping relationship, where the first mapping relationship is a mapping between states of the signal strength indicator and signal strengths.

The first mapping relationship is shown in Table 1.

TABLE 1

| States of a signal strength indicator | Signal strength |
| --- | --- |
| One-bar signal | 1 |
| Two-bar signal | 2 |
| Three-bar signal | 3 |

Figure 6:
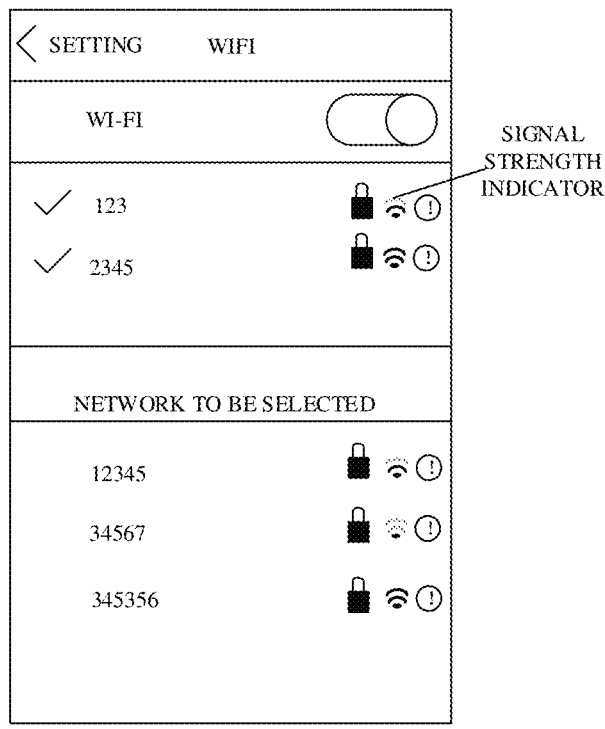
FIG. 6 is a schematic diagram of a WIFI setting UI provided in implementations of the present disclosure.

The state of the signal strength indicator is, for example, a one-bar signal, a two-bar signal, and a three-bar signal. As illustrated in FIG. 6, the electronic device currently accesses two WIFI networks, such as WIFI network 123 and WIFI network 2345. The state of the signal strength indicator of WIFI network 123 is a two-bar signal, and the state of the signal strength indicator of WIFI network 2345 is three-bar signal. Based on Table 1, the electronic device can determine that the signal strength of WIFI network 123 is 2, and the signal strength of WIFI network 2345 is 3.

Optionally, the electronic device determines the access priority of each of the two WIFI networks as follows.

The electronic device determines the number of access times the electronic device accesses each of the two WIFI networks in a second time period, and end time of the second time period is the present moment. The electronic device determines the access priority of each of the two WIFI networks based on determined two access times and a second mapping relationship, where the second mapping relationship is a mapping between access times and access priorities.

The length of the second time period is, for example, 5 h, 10 h, 20 h, 1 day, 3 days, 10 days, or other values.

The second mapping relationship is shown in Table 2. As shown in Table 2, the more the number of access times, the greater the corresponding access priority, and the less the number of access times, the lower the corresponding access priority.

TABLE 2

| Access times | Access priorities |
| --- | --- |
| 1~5 | 1 |
| 6~12 | 2 |
| 13~20 | 3 |
| ... | ... |

Optionally, the access priority of each of the two WIFI networks may be preset by the user. If an access priority of a certain WIFI network is not set, the access priority of the certain WIFI network is defined as a default priority (for example, access priority 2).

Optionally, the electronic device determines the target WIFI network based on the determined two access priorities and two signal strengths as follows.

The electronic device determines an evaluation value of each of the two WIFI networks based on a first formula, the two access priorities, and the two signal strengths, and the evaluation value being used to evaluate an importance of a corresponding WIFI network. The electronic device determines the target WIFI network based on determined two evaluation values.

The first formula is: $X=a*Y+b*Z$, where X is an evaluation value, a and b are weights, the sum of a and b is equal to 1, Y is an access priority, and Z is a signal strength. a may be greater than b, may also be smaller than b, or may be equal to b, which is not limited here.

The two WIFI networks include a first WIFI network and a second WIFI network, and the electronic device determines the target WIFI network based on the two determined evaluation values as follows.

If an evaluation value of the first WIFI network is less than an evaluation value of the second WIFI network, the electronic device assigns the first WIFI network as the target WIFI network; if the evaluation value of the second WIFI network is less than the evaluation value of the first WIFI network, the electronic device assigns the second WIFI network as the target WIFI network.

For example, suppose that the two WIFI networks accessed by the electronic device include WIFI network 1 and WIFI network 2, an access priority of WIFI network 1 is 1, an access priority of WIFI network 2 is 2, and a signal strength of WIFI network 1 is 2, a signal strength of WIFI network 2 is 3. If a=0.4, b=0.6, then an evaluation value of WIFI network 1 is 0.4*1+0.6*2=1.6, and an evaluation value of WIFI network 2 is 0.4*2+0.6*3=2.6, then the target WIFI network is WIFI network 1.

It can be seen that in the implementation of the present disclosure, the importance of a WIFI network is comprehensively judged based on a WIFI access priority and signal strength, which improves the accuracy of determining the importance of the WIFI network, thereby ensuring rationality of releasing a network interface.

In an implementation of the present disclosure, the electronic device releases the one of the two first network interfaces as follows.

The electronic device displays a first dialog box on a display screen of the electronic device, where the first dialog box is used to prompt to select a network interface to be released from the two first network interfaces, and the first dialog box displays at least one of the following information: access state of a WIFI network through each of the two first network interfaces, a signal strength of an accessed WIFI network, and an access priority of the accessed WIFI network. The electronic device releases a first network interface selected by a selection operation upon detecting the selection operation against the first dialog box.

Further, the network-sharing enablement request is triggered through an UI displayed on a display screen, as illustrated in FIG. 4.

The access state of a WIFI network through a first network interfaces may include accessing a certain WIFI network through the first network interface and not accessing the WIFI network through the first network interface.

Figure 7:
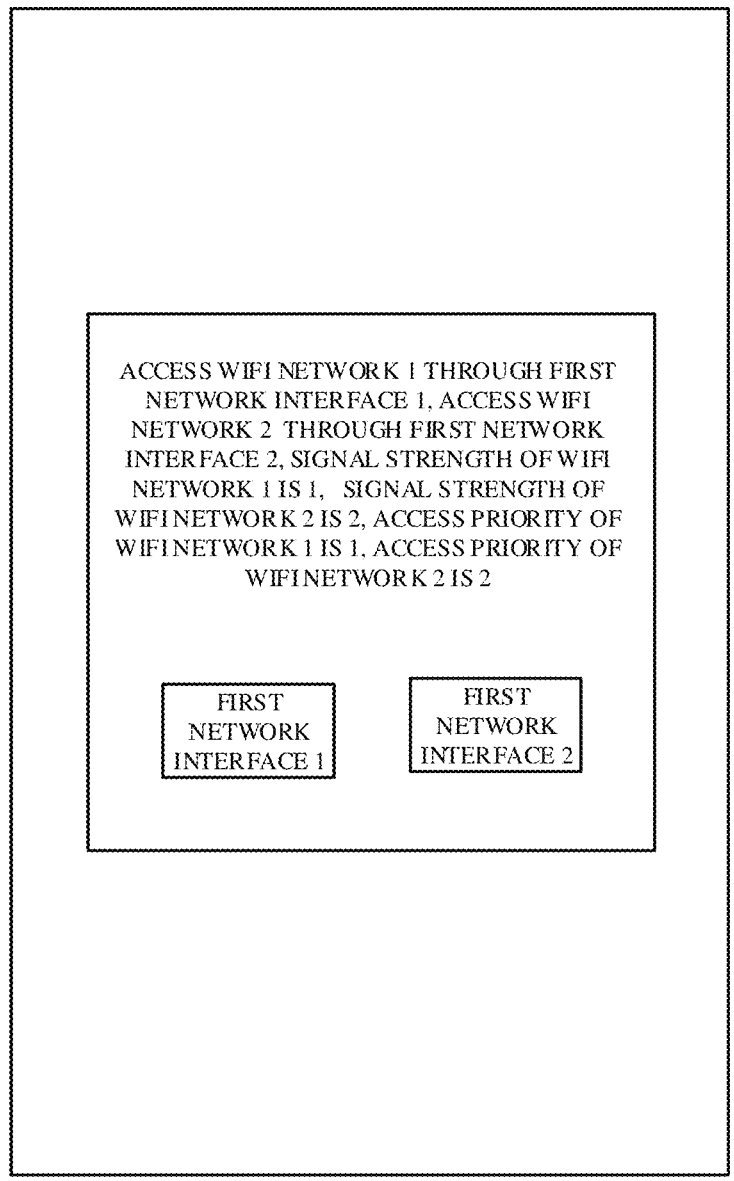
FIG. 7 is a schematic diagram of displaying a first dialog box provided in implementations of the present disclosure.

For example, suppose that the two first network interfaces created by the electronic device through the WIFI module include first network interface 1 and first network interface 2. If the electronic device has accessed WIFI network 1 through first network interface 1 and accessed WIFI network 2 through first network interface 2, a signal strength of accessed WIFI network 1 is 1, a signal strength of accessed WIFI network 2 is 2, an access priority of accessed WIFI network 1 is 1, and an access priority of accessed WIFI network 2 is 2, a displayed first dialog box can be as illustrated in FIG. 7. If the user clicks a virtual selection button of "First Network Interface 1" in FIG. 7, the electronic device will release first network interface 1.

It can be seen that, in the implementation of the present disclosure, the user is prompted to select a first network interface to be released by outputting a dialog box, which improves human-computer interaction experience. In addition, information of each first network interface is displayed through the dialog box, which ensures rationality of selecting a first network interface to be released by the user.

In an implementation of the present disclosure, after the electronic device enables network sharing, K target devices access the new WIFI network created by the electronic device, where K is a positive integer, and the method further includes the following.

The electronic device determines a distance between the electronic device and each of the target devices. If there are H distances greater than or equal to a fifth threshold among determined K distances, the electronic device determines a target signal transmission power based on the H distances, where H is a positive integer. The electronic device replaces a signal transmission power associated with the new WIFI network with the target signal transmission power.

Optionally, the electronic device determines the distance between the electronic device and each of the target devices as follows.

The electronic device broadcasts a detection request, where the detection request is used to request an immediate detection response after the detection request is received.

After receiving the detection response sent by each of the target devices for the detection request, the electronic device determines the distance between the electronic device and each of the target devices based on a first moment and K second moments, where the first moment is a moment at which the detection request is sent, and the second moment is a moment at which a detection response is received.

For example, suppose K=2, two target devices include target device 1 and target device 2, a moment when a detection request is sent is t1, a moment when a detection response sent by target device 1 is received is t2, and a moment when a detection response sent by target device 2 is received is t3, and then a distance between the electronic device and target device 1 is (t2−t1)*v, and a distance between the electronic device and target device 2 is (t3-t1)*v, where v is a signal transmission speed.

Optionally, the electronic device determines the target signal transmission power based on the H distances as follows.

The electronic device determines a target distance based on the H distances. The electronic device determines the target signal transmission power based on a second formula and the target distance, where the second formula is: W1= (S1/S2)*W2, W1 and W2 are both signal transmission powers, W2 is a set signal transmission power, S1 and S2 are both distances, and S2 is a set distance.

Optionally, the electronic device determines the target distance based on the H distances includes:

If H is equal to 1, the electronic device determines that the target distance is the H distances. If H is greater than 1, the electronic device assigns an average distance of the H distances as the target distance, or the electronic device assigns the largest distance among the H distances as the target distance.

It can be seen that, in the implementation of the present disclosure, after network sharing is enabled, the signal transmission power of the created WIFI network is adjusted based on the distances between the electronic device and the target devices accessing the WIFI network created by the electronic device, thereby increasing the signal strength of the created WIFI network and improving stability of network sharing.

Figure 8:
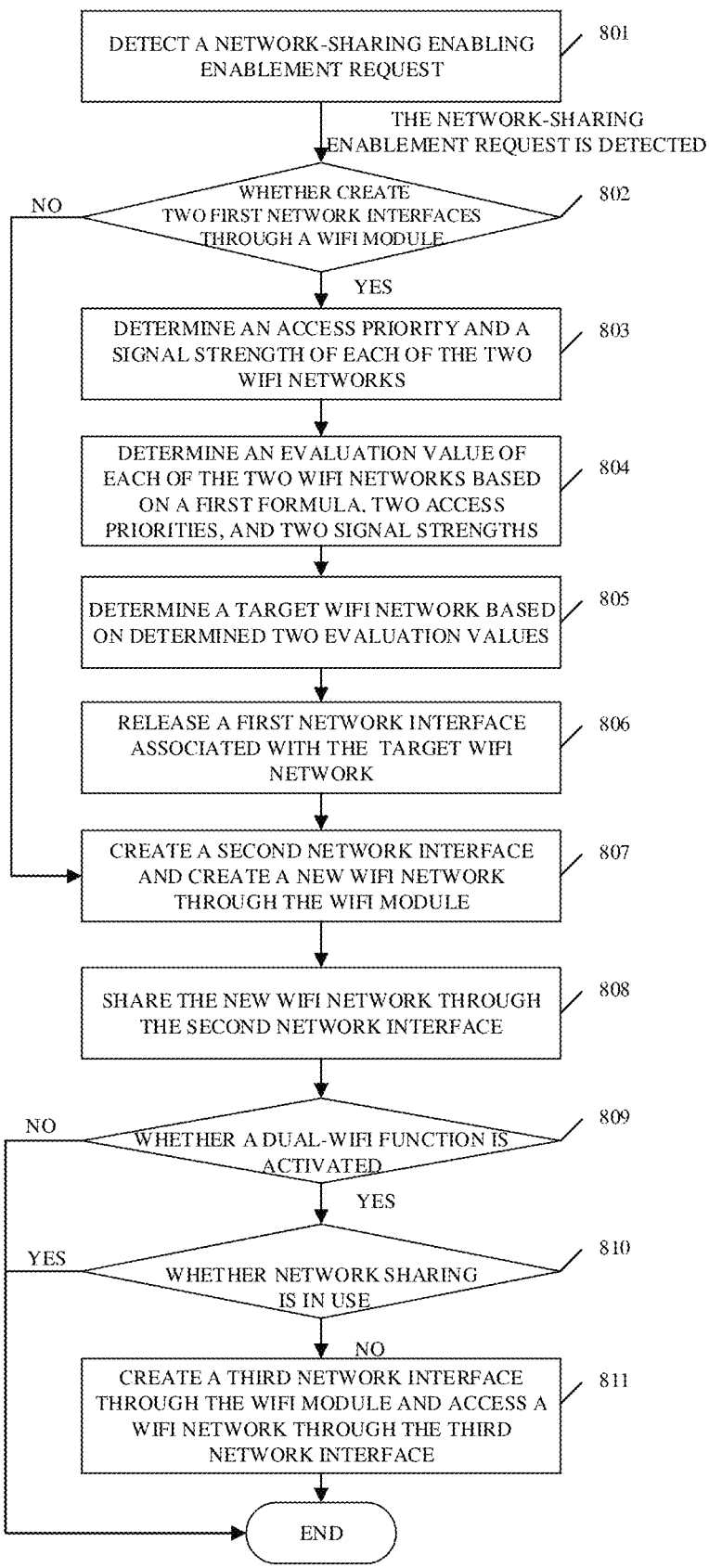
FIG. 8 is a schematic flow diagram of a method for network sharing provided in other implementations of the present disclosure.

Consistent with the implementations illustrated in FIG. 3, FIG. 8 is a schematic flow diagram of a method for network sharing provided in other implementations of the present disclosure. Reference is made to FIG. 8, the method for network sharing is applied to the above electronic device, and specifically includes following operations.

At 801, the electronic device detects a network-sharing enablement request.

When the network-sharing enablement request is detected, proceed to operations at 802. When the network-sharing enablement request is not detected, continue operations at 801.

At 802, the electronic device determines whether the electronic device has created two first network interfaces for WIFI network access through a WIFI module of the electronic device.

If YES, proceed to operations at 803; otherwise, proceed to operations at 807.

Furthermore, the electronic device has accessed two WIFI networks through the two first network interfaces.

At 803, the electronic device determines an access priority and a signal strength of each of the two WIFI networks.

At 804, the electronic device determines an evaluation value of each of the two WIFI networks based on a first formula, two access priorities, and two signal strengths, and the evaluation value being used to evaluate an importance of a corresponding WIFI network At 805, the electronic device determines a target WIFI network based on determined two evaluation values, the two WIFI networks including the target WIFI network.

At 806, the electronic device releases a first network interface associated with the target WIFI network.

When first network interface is released successfully, proceed to operations at 807.

When first network interface is not released successfully, proceed to operations at 806.

At 807, the electronic device creates a second network interface and creates a new WIFI network through the WIFI module.

At 808, the electronic device shares the new WIFI network through the second network interface.

At 809, the electronic device detects whether a dual-WIFI function of the electronic device is activated.

If YES, proceed to operations at 310; otherwise, perform no operations.

At 310, the electronic device determines whether network sharing is in use.

If YES, perform no operations; otherwise, proceed to operations at 311.

At 311, the electronic device creates a third network interface through the WIFI module upon a determination that network sharing is not in use, and accesses a WIFI network through the third network interface.

It should be noted that reference of a specific implementation process of this implementation can be made to a specific implementation process described in the foregoing method implementations, which will not be described here.

Figure 9:
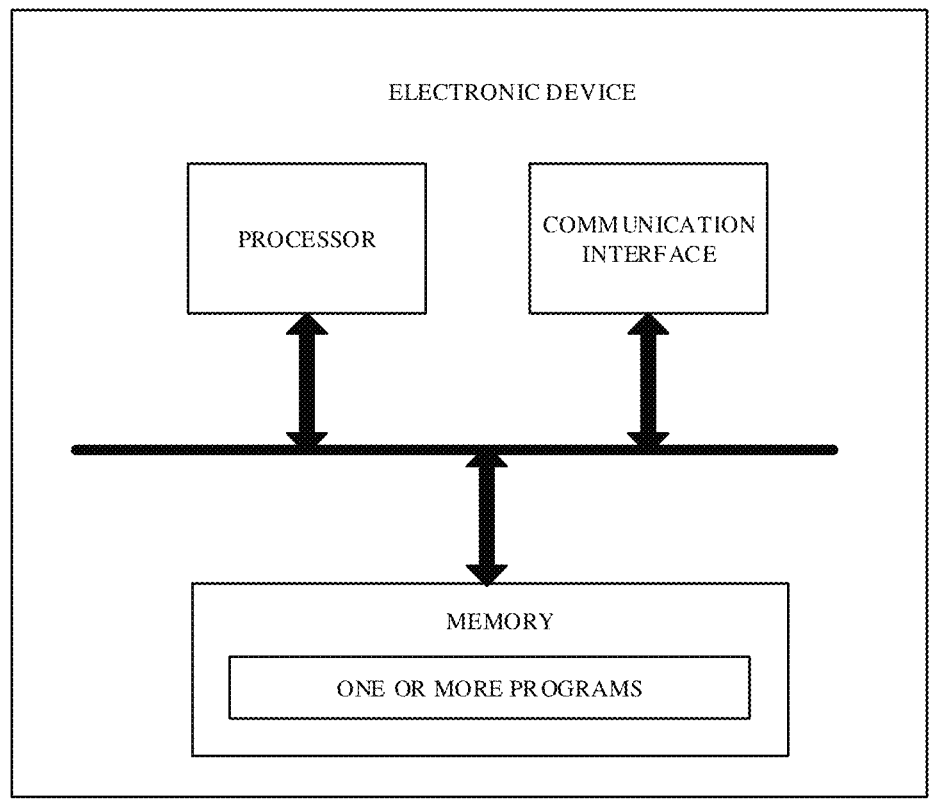
FIG. 9 is a schematic structural diagram of an electronic device provided in other implementations of the present disclosure.

As is consistent with the above-mentioned implementations illustrated in FIGS. 2A and 3A, reference is made to FIG. 9, which is a structural schematic diagram of an electronic device provided in implementations of the disclosure. As illustrated, the electronic device includes a processor, a memory, a communication interface, and one or more programs. The one or more programs are stored in the memory and configured to be executed by the processor, and the programs include instructions for executing following operations.

Upon detecting a network-sharing enablement request, whether the electronic device has created two first network interfaces for WIFI network access through a WIFI module of the electronic device is determined. One of the two first network interfaces is released upon a determination that the electronic device has created the two first network interfaces through the WIFI module. Network sharing is enabled once the one of the two first network interfaces is successfully released.

It can be seen that, in the implementations of the present disclosure, upon detecting the network-sharing enablement request, whether the electronic device has created two first network interfaces through the WIFI module is determined. When the electronic device has created the two first network interfaces through the WIFI module, one of the two first network interfaces is released. Once the one of the two first network interfaces is successfully released, network sharing is enabled. Since only one first network interface is released, coexistence of a Wi-Fi function and a network sharing function can be achieved and performance of an electronic device can be improved.

In an implementation of the present disclosure, in term of enabling network sharing, the programs include instructions for executing following operations.

A second network interface is created and a new WIFI network is created, through the WIFI module. The new WIFI network is shared through the second network interface.

In an implementation of the present disclosure, the programs further include instructions for executing following operations.

After network sharing is enabled, whether network sharing is in use is determined upon detecting that a dual-WIFI function of the electronic device is activated. A third network interface is created through the WIFI module upon a determination that network sharing is not in use, and a WIFI network is accessed through the third network interface.

In an implementation of the present disclosure, the electronic device accesses two WIFI networks through the two first network interfaces, in terms of releasing the one of the two first network interfaces, the programs include instructions for executing following operations.

At least two of a first numerical value, a second numerical value, a third numerical value, and a fourth numerical value are determined, where the first numerical value is a total data amount sent by the electronic device using a first WIFI network of the two WIFI networks in the first time period, the second numerical value is a total data amount received by the electronic device using the first WIFI network in the first time period, the third numerical value is a total data amount sent by the electronic device using a second WIFI network of the two WIFI networks in the first time period, and the fourth numerical value is a total data amount received by the electronic device using the second WIFI network in the first time period, end time of the first time period being present moment. A target WIFI network is determined based on the at least two of the first numerical value, the second numerical value, the third numerical value, and the fourth numerical value, the two WIFI networks including the target WIFI network. A first network interface associated with the target WIFI network is released.

In an implementation of the present disclosure, the electronic device accesses two WIFI networks through the two first network interfaces, in terms of releasing the one of the two first network interfaces, the programs include instructions for executing following operations.

An access priority and a signal strength of each of the two WIFI networks are determined. A target WIFI network is determined based on determined two access priorities and two signal strengths, the two WIFI networks including the target WIFI network. A first network interface associated with the target WIFI network is released.

In an implementation of the present disclosure, in terms of determining the target WIFI network based on the determined two access priorities and two signal strengths, the programs include instructions for executing following operations.

An evaluation value of each of the two WIFI networks is determined based on a first formula, the two access priorities, and the two signal strengths, and the evaluation value being used to evaluate an importance of a corresponding WIFI network. The target WIFI network is determined based on determined two evaluation values.

In an implementation of the present disclosure, in terms of releasing the one of the two first network interfaces, the programs include instructions for executing following operations.

A first dialog box is displayed on a display screen of the electronic device, where the first dialog box is used to prompt to select a network interface to be released from the two first network interfaces, and the first dialog box displays at least one of the following information: access state of a WIFI network through each of the two first network interfaces, a signal strength of an accessed WIFI network, and an access priority of the accessed WIFI network. A first network interface selected by a selection operation is released upon detecting the selection operation against the first dialog box.

It should be noted that a specific implementation process of this implementation can be referred to the specific implementation process described in the above method implementation, and will not be repeatedly described here.

Figure 10:
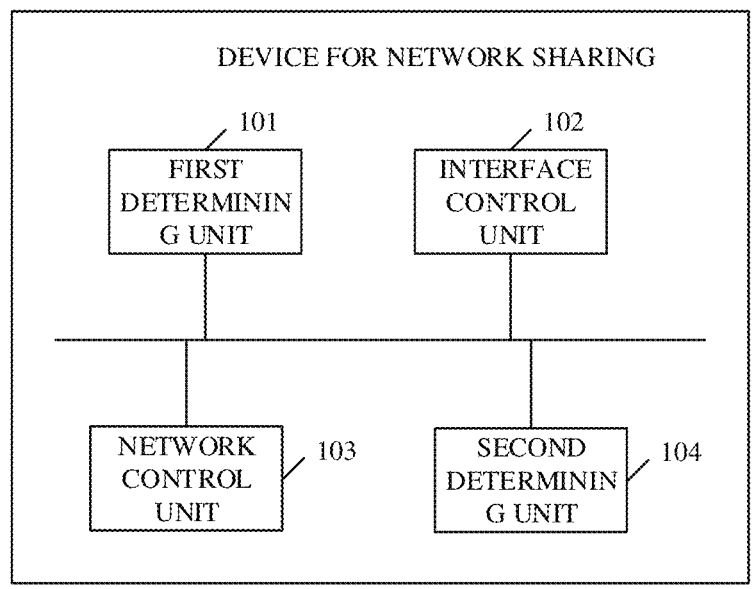
FIG. 10 is a schematic structural diagram of a device for network sharing provided in implementations of the present disclosure.

Reference is made to FIG. 10, which is a schematic structural diagram of a device for network sharing provided in implementations of the present disclosure, the device for network sharing is applied to an electronic device, and the device for network sharing includes a first determining unit 101, an interface control unit 102, and a network control unit 103.

The first determining unit 101 is configured to determine whether the electronic device has created two first network interfaces for WIFI network access through the WIFI module upon detecting a network-sharing enablement request.

The interface control unit 102 is configured to release one of the two first network interfaces upon a determination that the electronic device has created the two first network interfaces through the WIFI module.

The network control unit 103 is configured to enable network sharing once the one of the two first network interfaces is successfully released.

It can be seen that, in the implementations of the present disclosure, upon detecting the network-sharing enablement request, whether the electronic device has created two first network interfaces through the WIFI module is determined. When the electronic device has created the two first network interfaces through the WIFI module, one of the two first network interfaces is released. Once the one of the two first network interfaces is successfully released, network sharing is enabled. Since only one first network interface is released, coexistence of a Wi-Fi function and a network sharing function can be achieved and performance of an electronic device can be improved.

In an implementation of the present disclosure, in terms of enabling network sharing, the network control unit 103 is configured to: create a second network interface and create a new WIFI network through the WIFI module; share the new WIFI network through the second network interface.

In an implementation of the present disclosure, the device further includes a second determining unit 104.

The second determining unit 104 is configured to determine whether network sharing is in use after enabling network sharing by the network control unit 103 and upon detecting that a dual-WIFI function of the electronic device is activated.

The interface control unit 102 is configured to create a third network interface through the WIFI module upon a determination that network sharing is not in use;

The network control unit 103 is configured to access a WIFI network through the third network interface.

In an implementation of the present disclosure, once the electronic device accesses two WIFI networks through the two first network interfaces, in terms of releasing the one of the two first network interfaces, the interface control unit 102 is configured to: determine at least two of a first numerical value, a second numerical value, a third numerical value, and a fourth numerical value, where the first numerical value is a total data amount sent by the electronic device using a first WIFI network of the two WIFI networks in the first time period, the second numerical value is a total data amount received by the electronic device using the first WIFI network in the first time period, the third numerical value is a total data amount sent by the electronic device using a second WIFI network of the two WIFI networks in the first time period, and the fourth numerical value is a total data amount received by the electronic device using the second WIFI network in the first time period, end time of the first time period being present moment; determine a target WIFI network based on the at least two of the first numerical value, the second numerical value, the third numerical value, and the fourth numerical value, the two WIFI networks including the target WIFI network; release a first network interface associated with the target WIFI network.

In an implementation of the present disclosure, once the electronic device accesses two WIFI networks through the two first network interfaces, in terms of releasing the one of the two first network interfaces, the interface control unit 102 is configured to: determine an access priority and a signal strength of each of the two WIFI networks; determine a target WIFI network based on determined two access priorities and two signal strengths, the two WIFI networks including the target WIFI network; release a first network interface associated with the target WIFI network.

In an implementation of the present disclosure, in terms of determining the target WIFI network based on the determined two access priorities and two signal strengths, the interface control unit 102 is configured to: determine an evaluation value of each of the two WIFI networks based on a first formula, the two access priorities, and the two signal strengths, and the evaluation value being used to evaluate an importance of a corresponding WIFI network; determine the target WIFI network based on determined two evaluation values.

In an implementation of the present disclosure, in terms of releasing the one of the two first network interfaces, the interface control unit 102 is configured to: display a first dialog box on a display screen of the electronic device, where the first dialog box is used to prompt to select a network interface to be released from the two first network interfaces, and the first dialog box displays at least one of the following information: access state of a WIFI network through each of the two first network interfaces, a signal strength of an accessed WIFI network, and an access priority of the accessed WIFI network; release a first network interface selected by a selection operation upon detecting the selection operation against the first dialog box.

It should be noted that, the first determining unit 101, the interface control unit 102, the network control unit 103, and second determining unit 104 of the electronic device can be realized by a processor.

Implementations of the present disclosure further provide a computer-readable storage medium. The computer-readable storage medium stores a computer program for Electronic Data Interchange (EDI). The computer program causes a computer to perform some or all of operations as described for the electronic device in the above method implementations.

Implementations of the present disclosure further provide a computer program product. The computer program product includes a non-transitory computer readable storage medium storing a computer program. The computer program is operable to cause a computer to perform some or all of operations as described for the electronic device in the above method implementations. The computer program product can be a software installation package.

The operations of the method or algorithm described in the implementations of the disclosure can be realized in hardware or by the processor executing software instructions. The software instructions can be composed of corresponding software modules, which can be stored in random access memory (RAM), flash memory, Read Only Memory (ROM), erasable programmable ROM (EPROM), electrically EPROM (EEPROM), register, hard disk, removable hard disk, CD-ROM or any other form of storage medium known in the art. An exemplary storage medium is coupled to the processor so that the processor can read information from and write information to the storage medium. Of course, the storage medium can also be an integral part of the processor. The processor and the storage medium may be located in an ASIC. In addition, the ASIC can be located in an access network device, a target network device or a core network device. Of course, the processor and the storage medium can also exist as discrete components in the access network device, the target network device or the core network device.

Those skilled in the art should realize that in one or more of the above examples, functions described in the implementations of the disclosure can be realized in whole or in part in software, hardware, firmware or any combination thereof. When implemented in software, it can be fully or partially implemented in a form of a computer program product. The computer program product includes one or more computer instructions. When the computer program instructions are loaded and executed on a computer, all or part of the processes or functions described in the implementations of the disclosure are generated. The computer can be a general-purpose computer, a special-purpose computer, a computer network, or other programmable devices. The computer instructions can be stored in a computer-readable storage medium or transmitted from one computer-readable storage medium to another computer-readable storage medium. For example, the computer instructions can be transmitted from one website site, computer, server or data center to another website site, computer, server or data center by wire (such as a coaxial cable, an optical fiber, and a digital subscriber line (DSL)) or wirelessly (such as infrared, radio, microwave, etc.). The computer-readable storage medium can be any available medium that a computer can access or a data storage device including one or more available media integrated servers, data centers or the like. The available media can be magnetic media (e.g., floppy disk, hard disk, and magnetic tape), optical media (e.g., digital video disc (DVD)), or semiconductor media (e.g., solid state disk (SSD)), etc.

The purposes, technical schemes and beneficial effects of the disclosure are detailed in specific implementations described above. It should be understood that the above description is only the specific implementations of the disclosure and is not intended to limit a protection scope of the disclosure. Any modification, equivalent replacement, improvement, etc. on a basis of the technical schemes of the disclosure should be encompassed in the protection scope of the disclosure.

What is claimed is:

1. A method for network sharing, applied to an electronic device with a wireless fidelity (WIFI) module, the method comprising:
    upon detecting a network-sharing enablement request, determining whether the electronic device has created two first network interfaces for WIFI network access through the WIFI module;
    releasing one of the two first network interfaces upon a determination that the electronic device has created the two first network interfaces through the WIFI module; and
    enabling network sharing once the one of the two first network interfaces is successfully released;
    wherein enabling network sharing comprises:
        creating a second network interface and a new WIFI network through the WIFI module; and
        sharing the new WIFI network through the second network interface to enable another device to access the new WIFI network created by the electronic device.

2. The method of claim 1, further comprising:
    after enabling network sharing,
    determining whether network sharing is in use upon detecting that a dual-WIFI function of the electronic device is activated; and
    creating a third network interface through the WIFI module upon a determination that network sharing is not in use, and accessing a WIFI network through the third network interface.

3. The method of claim 1, wherein once the electronic device accesses two WIFI networks through the two first network interfaces, releasing the one of the two first network interfaces comprises:
    determining a target WIFI network based on at least two of a first numerical value, a second numerical value, a third numerical value, and a fourth numerical value, wherein the first numerical value is a total data amount sent by the electronic device using a first WIFI network of the two WIFI networks in a first time period, the second numerical value is a total data amount received by the electronic device using the first of the two WIFI network in the first time period, the third numerical value is a total data amount sent by the electronic device using a second WIFI network of the two WIFI networks in the first time period, and the fourth numerical value is a total data amount received by the electronic device using the second WIFI network in the first time period, end time of the first time period being present moment; the target WIFI network being one of the first WIFI network and the second WIFI network; and
    releasing a first network interface associated with the target WIFI network.

4. The method of claim 3, wherein determining the target WIFI network based on the at least two of the first numerical value, the second numerical value, the third numerical value, and the fourth numerical value comprises:
    determining the target WIFI network based on the second numerical value and the fourth numerical value when a task currently processed by the electronic device comprises a target task and the target task is processed using the two WIFI networks, in the target task, a total data amount expected to be received by the electronic device being greater than or equal to a threshold.

5. The method of claim 4, wherein determining the target WIFI network based on the second numerical value and the fourth numerical value comprises:
    assigning the second WIFI network as the target WIFI network upon a determination that the second numerical value is greater than the fourth numerical value; and
    assigning the first WIFI network as the target WIFI network upon a determination that the second numerical value is less than the fourth numerical value.

6. The method of claim 3, wherein determining the target WIFI network based on the at least two of the first numerical value, the second numerical value, the third numerical value, and the fourth numerical value comprises:
    determining the target WIFI network based on the first numerical value, the second numerical value, the third numerical value, and the fourth numerical when a task currently processed by the electronic device comprises a target task and the target task is processed using the two WIFI networks.

7. The method of claim 6, wherein determining the target WIFI network based on the first numerical value, the second numerical value, the third numerical value, and the fourth numerical comprises:
    assigning the second WIFI network as the target WIFI network upon a determination that a sum of the first numerical value and the second numerical value is greater than a sum of the third numerical value and the fourth numerical value; and
    assigning the first WIFI network as the target WIFI network upon a determination that the sum of the first numerical value and the second numerical value is less than the sum of the third numerical value and the fourth numerical value.

8. The method of claim 3, wherein determining the target WIFI network based on the at least two of the first numerical value, the second numerical value, the third numerical value, and the fourth numerical value comprises:
    determining the target WIFI network based on the first numerical value and the third numerical value, when a task currently processed by the electronic device comprises a target task and the target task is processed using the two WIFI networks, in the target task, a total data amount expected to be sent by the electronic device being greater than or equal to a threshold.

9. The method of claim 8, wherein determining the target WIFI network based on the first numerical value and the third numerical value comprises:
    assigning the second WIFI network as the target WIFI network upon a determination that the first numerical value is greater than the third numerical value; and
    assigning the first WIFI network as the target WIFI network upon a determination that the first numerical value is less than the third numerical value.

10. The method of claim 1, wherein once the electronic device accesses two WIFI networks through the two first network interfaces, releasing the one of the two first network interfaces comprises:
    determining an access priority and a signal strength of each of the two WIFI networks;
    determining a target WIFI network based on determined two access priorities and two signal strengths, the two WIFI networks comprising the target WIFI network; and
    releasing a first network interface associated with the target WIFI network.

11. The method of claim 10, wherein determining the target WIFI network based on the determined two access priorities and two signal strengths comprises:
    determining an evaluation value of each of the two WIFI networks based on a first formula, the two access priorities, and the two signal strengths, and the evaluation value being used to evaluate an importance of a corresponding WIFI network; and
    determining the target WIFI network based on determined two evaluation values.

12. The method of claim 1, wherein releasing the one of the two first network interfaces comprises:
    displaying a first dialog box on a display screen of the electronic device, wherein the first dialog box is used to prompt to select a network interface to be released from the two first network interfaces, and the first dialog box displays at least one of the following information: access state of a WIFI network through each of the two first network interfaces, a signal strength of an accessed WIFI network, and an access priority of the accessed WIFI network; and
    releasing a first network interface selected by a selection operation upon detecting the selection operation against the first dialog box.

13. The method of claim 1, further comprising:
    after enabling network sharing,
    determining a distance between the electronic device and each of K target devices, wherein the K target devices access the new WIFI network created by the electronic device, K being a positive integer;
    determining a target signal transmission power based on H distances upon a determination that the H distances are greater than or equal to a threshold among determined K distances, H being a positive integer and less than K; and
    replacing a signal transmission power associated with the new WIFI network with the target signal transmission power.

14. An electronic device, comprising a processor, a memory, a communication interface, a wireless fidelity (WIFI) module, and one or more programs, wherein the one or more programs are stored in the memory and configured to be executed by the processor, and the programs comprise instructions for executing:
    determining whether the electronic device has created two first network interfaces for WIFI network access through the WIFI module upon detecting a network-sharing enablement request;
    releasing one of the two first network interfaces upon a determination that the electronic device has created the two first network interfaces through the WIFI module; and
    enabling network sharing once the one of the two first network interfaces is successfully released;
    wherein in terms of enabling network sharing, the programs comprise instructions for executing:
        creating a second network interface and a new WIFI network through the WIFI module; and sharing the new WIFI network through the second network interface to enable another device to access the new WIFI network created by the electronic device.

15. The electronic device of claim 14, wherein the programs further comprise instructions for executing:

determining whether network sharing is in use after network sharing is enabled and upon detecting that a dual-WIFI function of the electronic device is activated; and creating a third network interface through the WIFI module upon a determination that network sharing is not in use, and accessing a WIFI network through the third network interface.

16. A non-transitory computer-readable storage medium storing a computer program, wherein the computer program is processed to execute:

determining whether an electronic device has created two first network interfaces for WIFI network access through a wireless fidelity (WIFI) module upon detecting a network-sharing enablement request;

releasing one of the two first network interfaces upon a determination that the electronic device has created the two first network interfaces through the WIFI module; and enabling network sharing once the one of the two first network interfaces is successfully released;

wherein in terms of enabling network sharing, the computer program is processed to execute:

creating a second network interface and a new WIFI network through the WIFI module; and sharing the new WIFI network through the second network interface to enable another device to access the new WIFI network.

17. The non-transitory computer-readable storage medium of claim 16, wherein the computer program is processed to further execute:

determining whether network sharing is in use after network sharing is enabled and upon detecting that a dual-WIFI function of the electronic device is activated; and creating a third network interface through the WIFI module upon a determination that network sharing is not in use, and accessing a WIFI network through the third network interface.

\* \* \* \* \*